Patented Aug. 9, 1938

2,126,282

UNITED STATES PATENT OFFICE 2,126,282

CATALYST AND PROCESS OF MAKING THE SAME

James R. Rose, Edgeworth, Pa., assignor of three-fourths to Michael L. Benedum and Joseph C. Trees, Pittsburgh, Pa.

No Drawing. Application December 2, 1936, Serial No. 113,836

2 Claims. (Cl. 23—233)

My invention relates to catalysts. While capable of use for other purposes, the catalyst to which my invention relates has proven to be particularly effective in the production of gasoline and other hydrocarbon compounds from the waste gases that come from oil refining plants. These gases are designated in the trade by various names, such as stabilizers, refluxes, gases arising from vapor-phase cracking plants, receiver gases, and still gases. For convenience of identification, these gases will be referred to hereinafter as "still gases".

The catalyst disclosed and claimed herein has been employed with marked success in a process of extracting gasoline from still gases which will now be described in brief.

The gases are delivered to a suitable receiver, such as an ordinary gas holder, and are delivered thence to a compressor whereby they are subjected to and maintained under a pressure of from 200 to 1200 pounds per square inch; they are then conducted through tubes in a suitable heating stove, where the temperature of the gases will be raised to from 200° to 1000° F., while still under the aforesaid pressure; and, while still under the aforesaid pressure and temperature, the gases are passed through the catalyst, contained in suitable chambers and, after having been reacted upon by the catalyst, are conducted through a cooler, while still under the aforesaid pressure; the resultant liquid and whatever gases may have been uncondensed in the cooler are then delivered into a receiver through a pressure-reducing valve, the pressure in said receiver being approximately 150 pounds per square inch. The gases which have not been condensed may at this stage be delivered into the holder, thereby to be recycled, together with the still gases therein. From the receiver, the liquid, with whatever unliberated and uncondensable gases may still remain therein, is delivered by a pump into a stabilizer.

The foregoing general treatment of still gases is described and claimed in my copending application Serial No. 111,654, filed November 19, 1936.

In the practice of my process, the efficient extraction of gasoline and other hydrocarbon compounds from the still gases is dependent upon the use of a suitable catalyst. I have found that, for this purpose, the catalyst herein described has given results far in excess of those obtainable by the use of any other catalyst which has been employed for this purpose and with which I am familiar.

My catalyst is made in the following manner:—

I first mix from 5 to 50 parts by weight of powdered or finely divided phosphate rock with from 5 to 50 parts by weight of powdered or finely divided kaolin or china clay. The mixture of phosphate rock and kaolin or china clay is then made into a stiff paste by admixture with water. The pasty mass thus produced is then rolled into a form suitable for breaking into lumps or particles of the desired size, and is dried and baked. After the drying and baking operation, it is broken into lumps or particles. Phosphoric anhydride ($P_2O_5$) in a dried, finely divided condition is then mixed with the lumps or particles in the proportion of from 5 to 10 parts by weight of the powdered or finely divided phosphoric anhydride to the weight of the lumps or particles.

The proportions of the ingredients which enter into the catalyst will vary in accordance with the character of the still gases received from a refinery; and the lumps or particles will be of suitable size to present a large surface area to the gases passing therethrough. In some instances, I have found it advisable to use equal proportions by weight of the phosphate rock and the kaolin or china clay.

Having thus described my invention, what I claim is:

1. A catalyst suitable for the production of gasoline from still gases comprising integrated particles of phosphate rock and kaolin or china clay admixed in proportions of 5 to 50 parts by weight of each to 5 to 50 parts by weight of the other; with dried finely divided phosphoric anhydride mingled with the said lumps or particles in the proportion of from 5 to 10 parts by weight of phosphoric anhydride to the weight of the said lumps or particles.

2. The process of manufacturing a catalyst suitable for the production of gasoline from still gases, the said process comprising first forming integrated particles of phosphate rock and kaolin or china clay by mixing the ingredients together in a finely divided condition and in the proportions of 5 to 50 parts by weight of each to 5 to 50 parts by weight of the other; adding water to and mingling the same with the foregoing mixture to form a pasty mass; drying the mixture thus produced; breaking the dried mixture into lumps or particles of the desired size; and thereafter mixing with the integrated lumps or particles thus produced dry finely divided phosphoric anhydride in the proportion of from 5 to 10 parts by weight of phosphoric anhydride to the weight of the said lumps or particles.

JAMES R. ROSE.